United States Patent
Pompe et al.

(10) Patent No.: US 11,103,936 B2
(45) Date of Patent: Aug. 31, 2021

(54) INTERNAL MILLING MACHINE

(71) Applicant: MAG IAS GmbH, Eislingen (DE)

(72) Inventors: Walter Pompe, Gingen (DE); Andreas Schweizer, Bad Ditzenbach Gosbach (DE); Günther Puschina, Bad Boll (DE); Achim Fleischer, Wäschenbeuren (DE); Anders Helmut, Gammelshausen (DE); Ralf Rummel, Göppingen (DE); Manuel Schwarz, Ulm (DE); Daniel Ost, Albershausen (DE)

(73) Assignee: MAG IAS GmbH, Eislingen (DE)

( * ) Notice: Subject to any disclaimer, the term of this patent is extended or adjusted under 35 U.S.C. 154(b) by 118 days.

(21) Appl. No.: 16/322,810

(22) PCT Filed: Jul. 28, 2017

(86) PCT No.: PCT/EP2017/069143
§ 371 (c)(1),
(2) Date: May 7, 2020

(87) PCT Pub. No.: WO2018/024627
PCT Pub. Date: Feb. 8, 2018

(65) Prior Publication Data
US 2020/0269332 A1    Aug. 27, 2020

(30) Foreign Application Priority Data
Aug. 2, 2016   (DE) .......................... 102016114252.2

(51) Int. Cl.
*B23C 3/06*       (2006.01)
*B23C 1/04*       (2006.01)
(Continued)

(52) U.S. Cl.
CPC ................ *B23C 3/06* (2013.01); *B23B 3/065* (2013.01); *B23C 1/04* (2013.01); *B23C 5/26* (2013.01);
(Continued)

(58) Field of Classification Search
CPC ... Y10T 409/307616; Y10T 409/30756; Y10T 82/19; B23C 3/06; B23C 2215/20;
(Continued)

(56) References Cited

U.S. PATENT DOCUMENTS 4,157,055 A   6/1979   Marzy
4,180,359 A   12/1979  Schmid
(Continued)

FOREIGN PATENT DOCUMENTS

CN    102548691    7/2012
DE    2239380      2/1974
(Continued)

OTHER PUBLICATIONS

Bibliographic data JPS5380092A from worldwide.espacenet.com, Jul. 15, 1978.*
(Continued)

*Primary Examiner* — Erica E Cadugan
(74) *Attorney, Agent, or Firm* — Head, Johnson, Kachigian & Wilkinson, PC

(57) ABSTRACT

In the internal milling machine according to the invention for milling a work piece that rotates during machining with an annular internal milling cutter (5) on the one hand side the Z slide (4a, b) of each tool support (3a, b) includes a pass through opening and on the other hand side the transversal slide (7) supporting the internal milling cutter (5) is move able in the X-direction, the running direction of the mounting surface (1a) of the bed (1) wherein the mounting surface slopes downward in a forward direction. Based on this
(Continued)

general configuration and in particular the arrangement of the Z-slides (6a, b) for the at least one tool support (3a, b) outside of the Z-supports (16a, b) for the opposite spindle stock (2') yields advantageous centers of gravity in particular of the move able components and a high level of stability of the machine and therefore high level of machining precision of the machine.

17 Claims, 11 Drawing Sheets

(51) Int. Cl.
| | | |
|---|---|---|
| *B23Q 1/01* | (2006.01) | |
| *B23Q 1/62* | (2006.01) | |
| *B23Q 1/25* | (2006.01) | |
| *B23C 5/26* | (2006.01) | |
| *B23Q 11/00* | (2006.01) | |
| *B23Q 1/26* | (2006.01) | |
| *B23B 3/06* | (2006.01) | |

(52) U.S. Cl.
CPC ............ *B23Q 1/012* (2013.01); *B23Q 1/015* (2013.01); *B23Q 1/262* (2013.01); *B23Q 1/621* (2013.01); *B23Q 11/0053* (2013.01); *B23Q 11/0057* (2013.01); *B23C 2215/20* (2013.01); *B23C 2220/68* (2013.01); *B23C 2230/04* (2013.01); *B23C 2260/04* (2013.01); *Y10T 29/5109* (2015.01); *Y10T 409/304088* (2015.01); *Y10T 409/307168* (2015.01); *Y10T 409/307616* (2015.01)

(58) Field of Classification Search
CPC ..... B23C 2220/68; B23C 3/08; B23D 37/005; B23B 5/18; B24B 5/423
USPC ................ 409/199, 200; 451/181; 82/106
See application file for complete search history.

(56) References Cited

U.S. PATENT DOCUMENTS

| | | | |
|---|---|---|---|
| 4,525,112 A | | 6/1985 | Blaimschein et al. |
| 4,768,904 A | * | 9/1988 | Schmid ................ B23D 37/005 409/262 |
| 5,707,187 A | * | 1/1998 | Arnold ...................... B23C 3/06 409/200 |
| 7,179,029 B2 | | 2/2007 | Hemming et al. |
| 7,204,004 B2 | * | 4/2007 | Hashimoto .......... B23Q 39/028 29/27 C |
| 7,266,871 B2 | * | 9/2007 | Takeuchi ................ B23B 3/065 29/27 C |
| 7,544,020 B2 | * | 6/2009 | Emoto ...................... B23C 3/06 407/34 |
| 2012/0148351 A1 | | 6/2012 | Heinloth et al. |
| 2020/0023448 A1 | * | 1/2020 | Knecht .................... B23C 5/08 |

FOREIGN PATENT DOCUMENTS

| | | | |
|---|---|---|---|
| DE | 2923809 A | * | 12/1980 |
| DE | 3544658 C1 | * | 12/1986 |
| EP | 0417446 | | 3/1991 |
| JP | 6027293 Y2 | * | 7/1994 |
| JP | 2004-154926 A | * | 6/2004 |
| JP | A2004314295 | | 11/2004 |
| JP | T2013503753 | | 2/2013 |

OTHER PUBLICATIONS

Bibliographic data JPS563120A from worldwide.espacenet.com, Jan. 13, 1981.*

* cited by examiner

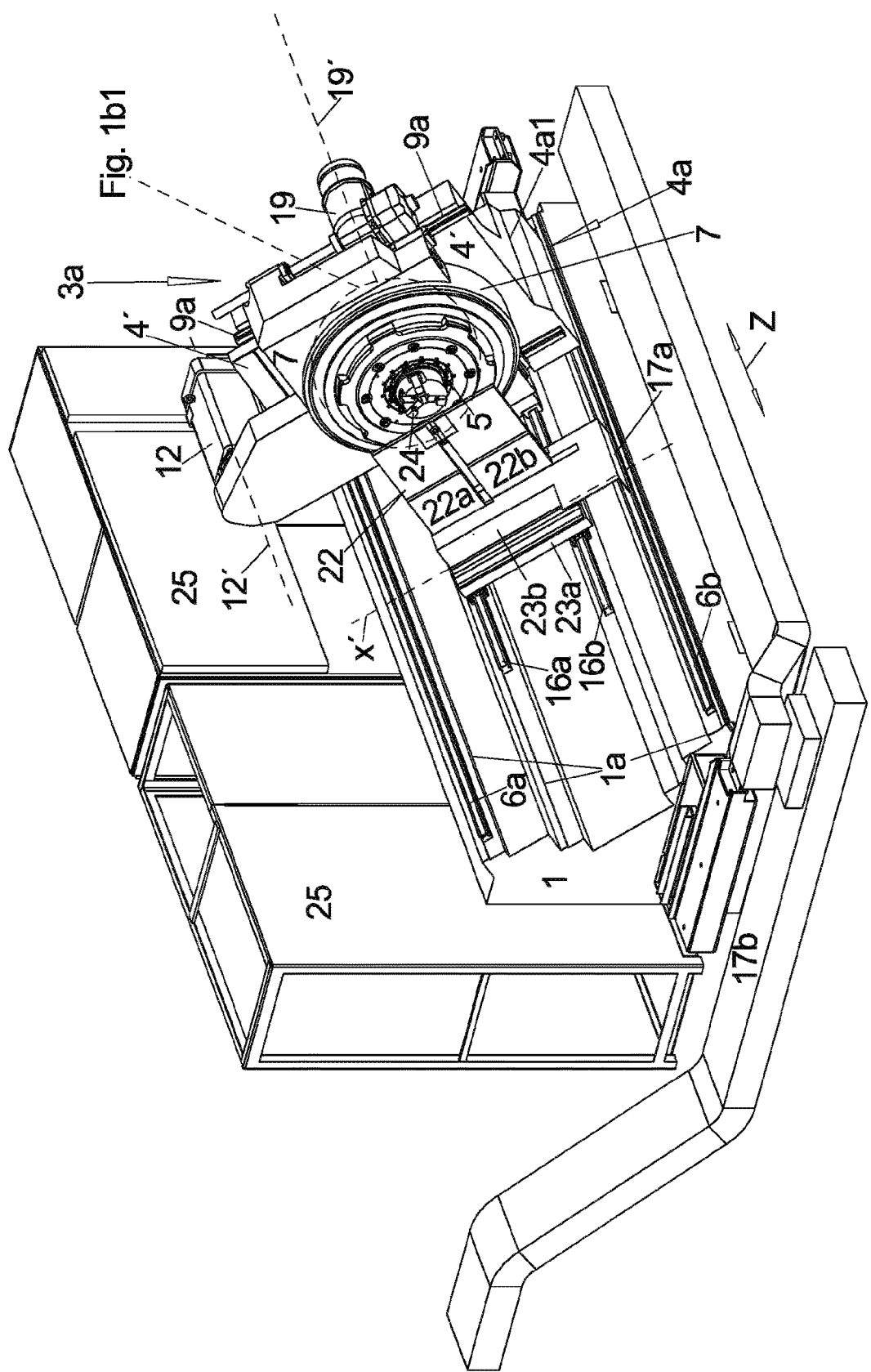

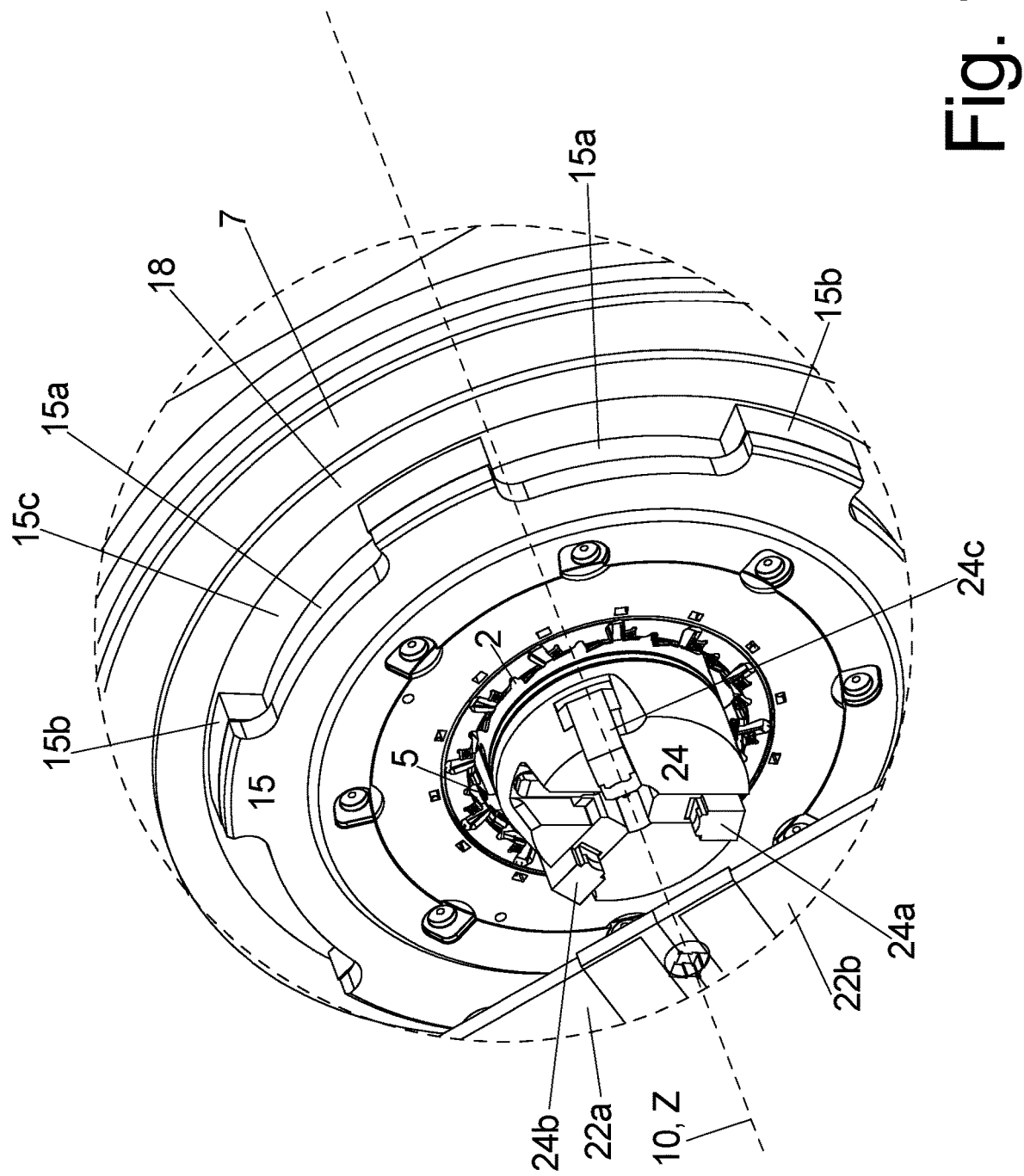

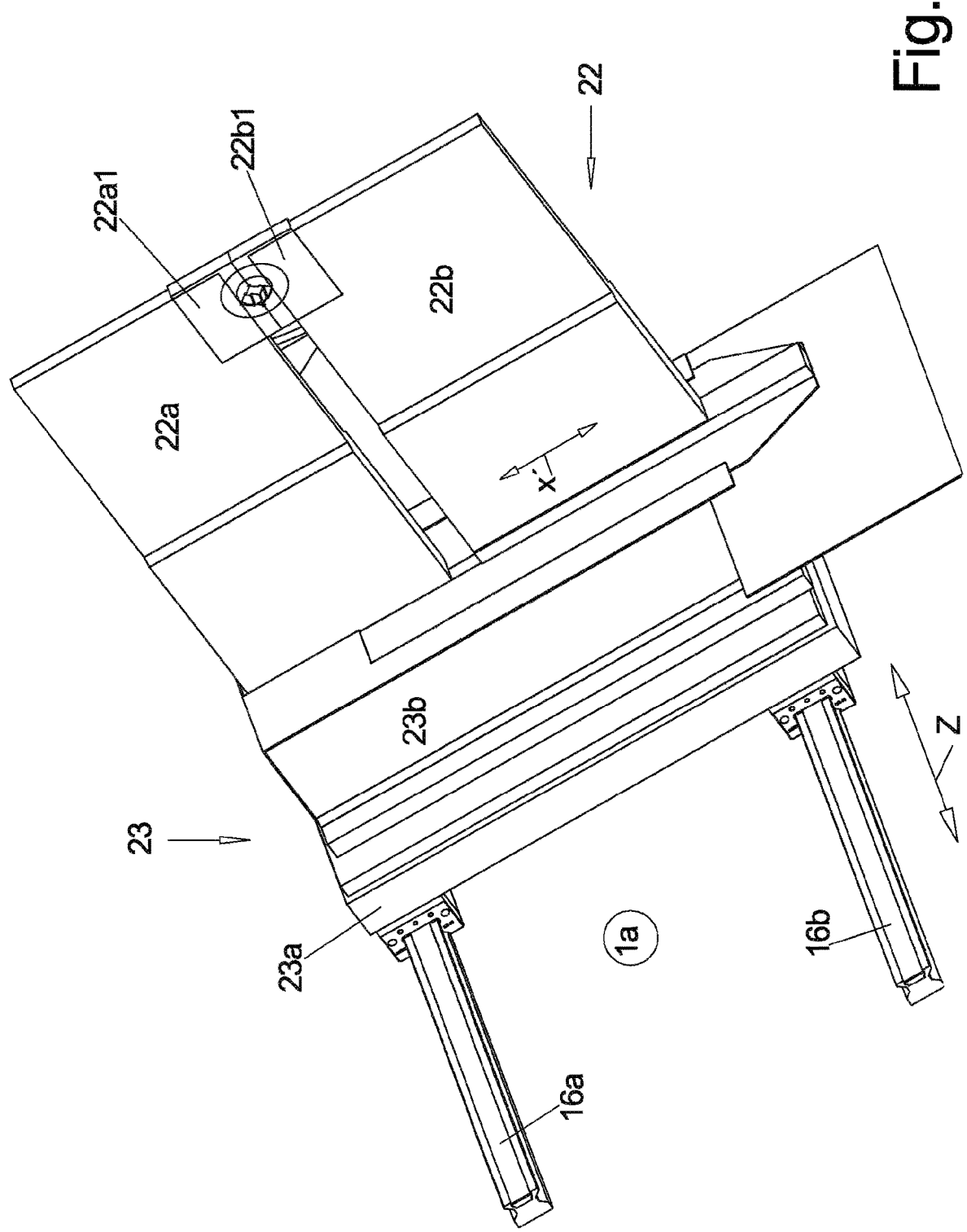

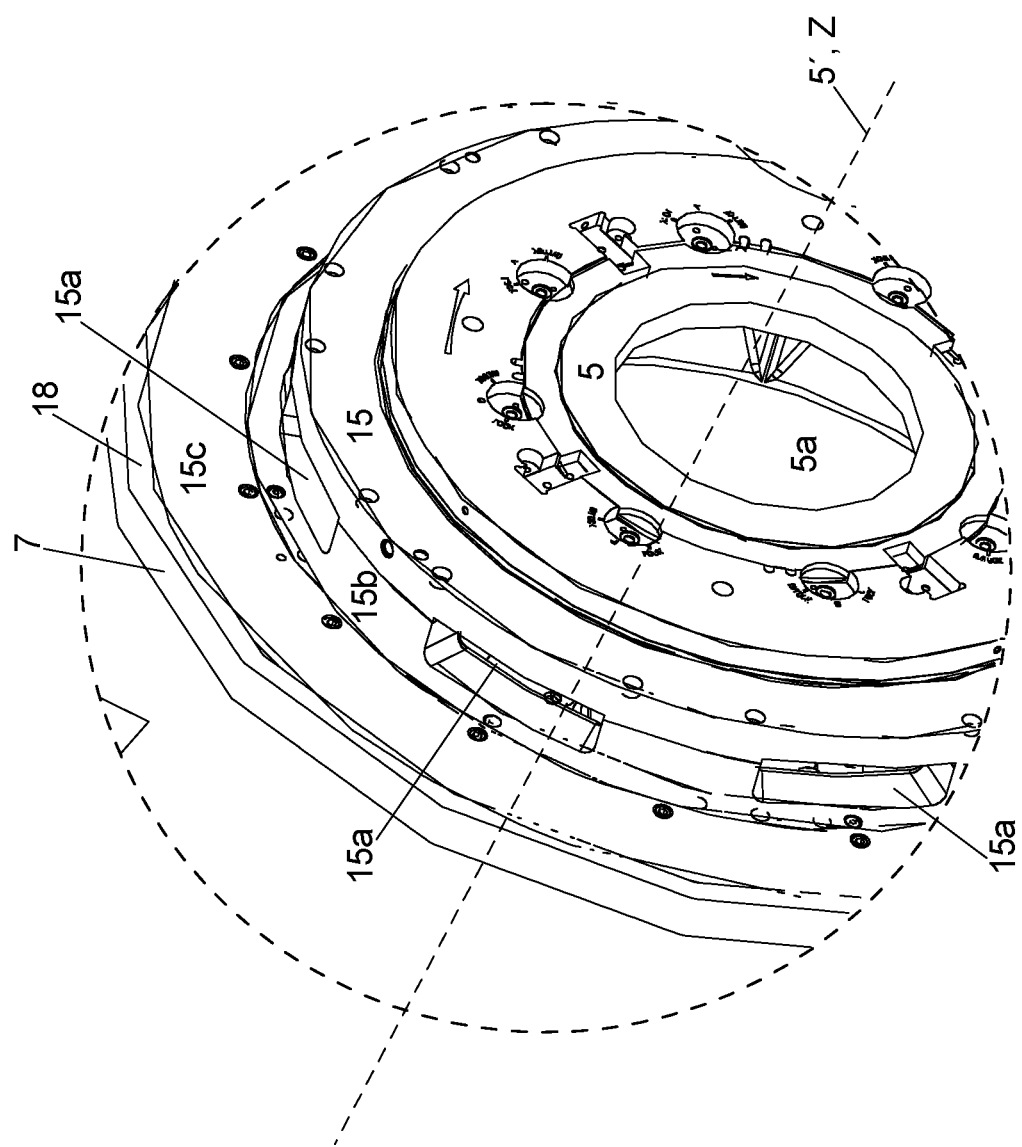

INTERNAL MILLING MACHINE

I. FIELD OF THE INVENTION

The invention relates to a turn milling machine for machining shafts, in particular crank shafts with an annular cutter with internal teething, a so called internal milling cutter.

II. BACKGROUND OF THE INVENTION

Central main journals of a crank shaft can be machined rather easily with other chipping methods like e.g. turning, however machining the eccentrically arranged crank journals is more difficult.

Thus, typically milling is preferred for this purpose, optionally milling with a side milling cutter with external teething or with an end milling cutter that has at least one cutting edge at its face or with an internal milling cutter, thus an annular cutter that has teething at an inner circumference.

When performing turn milling a rotation of the work piece about a Z-axis is required, in addition to the rotation of the cutter about the cutter axis which provides a revolution of the cutter about the circumferential surface to be machined, in case of a rotation symmetrical circumferential surface of a bearing about the circumferential surface of the bearing.

Thus, so called internal milling cutters are known, thus annular cutters with cutting edges at their inner circumference wherein an outer circumferential surface of the work piece that is to be machined extends through the inner circumference of the cutter.

There two basic configurations of internal milling machines

1. Wobble Machines

In so called wobble machines that have been used since the 1980's the work piece to be machined, e.g. the crank shaft is stationary during the milling and the center of the annular internal milling cutter orbits about the stationary bearing journal that is to be machined.

2. Internal Milling Machines with Rotating Work Piece

The work piece, in particular the crank shaft rotates during milling so that it suffices that the rotating internal milling cutter is move able only in a transversal direction S relative to the longitudinal direction Z, the rotation axis of the crank shaft which is defined as Z-direction in all turning machines. The transversal movement of the internal milling cutter however has to be controllable adapted to the controlled rotation of the work piece about the Z-axis.

Subsequently crank shafts are discussed without limiting the invention to crank shafts. To the contrary also all other shafts and provided circumferential surfaces, in particular circumferential surfaces with a circular cylindrical cross section can be machined by the machine according to the invention.

In the second embodiment the machine is configured in principle like a turning machine, thus with one or advantageously two spindle stocks oriented against each other wherein each spindle stock has a tool spindle with a clamping chuck arranged at a face side, wherein one of the two ends of the crank shaft is clamped in the clamping chuck and rotate able in a controlled manner about the rotation axis which runs in the Z-direction adapted to the transversal movement of the internal milling cutter.

The advantage of the internal milling cutter relative to an external cutter are the smaller transversal dimensions of the machine in the Z-direction and in particular the smaller production costs of the surfaces that are to be machined which is a function of the smaller number of cutting edges at an internal milling cutter compared to an external cutter that can machined the same journal.

In many internal milling machines the support for the milling unit is arranged laterally offset parallel to the at least one spindle stock and move able on capital Z supports at this location, wherein the Z supports typically extend parallel and also laterally offset to the Z supports of the spindle stock, which however does not provide optimum stability for the machine.

Thus it is known for milling machines and also for turning machines to provide the machine bed as a slanted bed, thus with a mounting surface that drops at a slant angle from behind in forward direction wherein the remaining components of the machine are attached to the mounting surface like e.g. the at least one spindle stock, optionally a tail stock, an additional clamping device and the at least one tool support.

This facilitates easy access for the operator to the individual components in particular during maintenance or for changing the tools. This also has the effect that chips falling onto the mounting surface slide from the bed quickly into a separate chip conveyor that extends in front of a front edge of the bed so that a time period during which the chips that become very hot during milling can be transferred to the bed is very short so that the heating of bed is rather limited.

III. BRIEF SUMMARY OF THE INVENTION a) Technical Object

Thus, it is an object of the invention to provide a machine that is suitable for turn milling a crank shaft with an internal milling cutter, wherein the machine has a high level of stability in spite of a simple configuration and thus provides manufacturing precision with good operability and accessibility of all components of the machine.

b) Solution

The object is achieved by the features according to the present invention.

In the instant application the directions and planes are defined as following:

Z-Direction:

Direction of the rotation axis about which the crank shaft clamped into the chucks of the tool spindle of the at least one spindle stock is rotated during milling.

Transversal Plane:

A plane that extends perpendicular to the Z-direction.

Mounting Surface:

The surface of the bed on which the cutter support is attached.

Support Surface:

The contact surface of the bed on the ground. Since the bed typically does not contact the ground directly with its bottom side but small legs are attached at the bottom side of the bed the support surface is the surface defined by the lower contact surfaces of all small legs.

X Direction

A transversal direction extending perpendicular to the Z-direction in the transversal plane which defines the mounting surface of the bed together with the Z-direction wherein the cutter support is attached to the mounting surface. The mounting surface of bed does not have to be flat but can have shoulders however the X direction has the largest extension of the mounting surface behind the extension in the Z direction if the mounting surface is 3 dimensional.

X' Direction

Travel direction of the internal milling cutter in the transversal plane, advantageously identical with the X-direction and inclined at the most by an additional angle of 45° relative to the X-direction.

Y-Direction

A third direction in space that is perpendicular to the Z-direction as well as the X-direction.

The object is achieved improving upon a generic machine which typically has 2 spindle stocks with chucks facing each other in that a Z-slide for at least one cutter support is configured as a bridge shaped thus portal shaped portal slide with an inverted U-shape in a Z-direction and the two free lower ends of the 2 freely terminating arms of the U-shape of the portal slide are move able respectively on a first Z-support that is move able in the Z-direction that extends along the bed.

The intermediary space between the arms of the portal slide is large enough to pass the work piece or the chuck or the spindle stock through depending on a current Z position of the Z slide.

Furthermore a transversal slide, the so called X-slide is move able at this portal slide in the X' direction along two transversal supports that are offset from each other wherein the transversal supports are arranged on opposite sides with respect to the rotation axis of the machine.

Since the internal milling cutter is rotate ably supported in the transversal slide between the 2 transversal slides this configuration provides a very stable and precise support and guidance of the internal milling cutter due to the short lever length between the supports and the internal milling cutter which is essential for a high level of machining precision of the work piece.

In particular an arrangement is preferred where a base of a vertical on the X-direction from a center of the cutter viewed in the Z-direction is outside of the intermediary space between the Z-supports for the tool support at least during machining, advantageously in no regular functional condition of the milling machine.

Since the X' direction in which the transversal slide is move able can only be inclined relative to the X-direction in which the mounting surface of the bed is arranged by the an additional angle of 45° at the most flatter or steeper this yields an advantageous center of gravity position of the cutter support above the machine bed and the installed height of the machine can be kept smaller than in a configuration where the transversal slide is move able e.g. orthogonal to the mounting surface.

Since the machine bed is also a slanted bed thus the mounting surface is sloped downward from the back towards the operator side this has additional advantages. When the mounting surface is slanted sufficiently the chips falling thereon slide downward self-acting following gravity with a small dwelling time on the mounting surface or a cover arranged above the mounting surface. This reduces the heating of the machine bed.

When the front edge of the mounting surface is offset from the bottom side of the bed, in particular its support surface relative to the ground a chip conveyor can extend in the longitudinal direction of the bed in particular Z-direction directly in front and below the front edge, wherein the chips slide into the chip conveyor and wherein the chip conveyor is a component that is separate from the bed.

Thus, the recesses in the ground that are often required for a chip conveyor below a bed with a horizontal mounting surface are avoid able. Also accessibility of the chip conveyor is greatly improved.

Thus a longitudinal chip conveyor typically extends in the Z-direction, wherein the chips fall into the chip conveyor and wherein the longitudinal chip conveyor transfers the chips at its end to a transversal chip conveyor which typically extends at a right angle to the extension of the longitudinal chip conveyor in the horizontal direction along a face of the bed and which transports the chips for example to a collection container.

The slope of the mounting surface of the bed from the back forward, thus in X-direction has proven to be at an optimum when the bed angle between the mounting surface and the support surface of the bed is between 40° and 60° in particular between 45° and 55°, in particular between 48° and 52°. Thus on the one hand side a gravity induced sliding of the chips is still possible and on the other hand side an installation height of the machine is not excessive and a center of gravity of the cutter support supported thereon is not excessively far forward and thus the machine is not nose heavy.

The travel direction X' of the X slide should be inclined relative to the X direction by an additional 45° at the most, better by an additional 30° at the most, better by an additional 15° at the most, better by an additional 5° at the most in order to minimize the installed height of the machine on the one hand side if the travel direction X' is identical with the X-direction to simplify the control.

The inner free pass through of the internal milling cutter is greater than a cross section of the circumferential surface viewed in the Z-direction and in particular than an overall cross section of the crank shaft to be machined, so that the portal slide with the internal milling cutter adjusted accordingly in the transversal direction can be moved in the Z direction over the entire extension along the crank shaft running through it.

The free pass through opening of the internal milling cutter is furthermore in particular also greater than an external circumference of the adjacent chuck of the tool spindle so that the internal cutter can be moved in the Z direction into the portion of the chuck and so that it reaches around the chuck.

The free pass through opening of the internal cutter is furthermore in particular also greater than an outer circumference of the work piece spindle, so that the internal milling cutter is move able in the Z-direction into the portion of the work piece spindle and movable so that it can reach around the work piece spindle.

Thus, the entire portion between the chucks and including the longitudinal portion of the chucks is freely accessible for clamping a new crank shaft into the machine.

Simultaneously the transversal slide with the internal milling cutter shall be move able along the its transversal slides in forward downward direction so that the internal milling cutter is arranged for assembly work and in particular exchanging the internal milling cutter at an operating level of an operator that is standing in front of the machine, thus below head level of the operator. Advantageously the rotation axis of the machine does not run through the clear inner space, the throwing circle of the internal milling cutter in this exchange position.

For the same reason the milling motor driving the milling cutter wherein the milling motor is attached at the transversal slide is attached at the transversal slide with respect to the cutter axis on a front side, advantageously above the cutter axis, wherein care has to be taken that the center of gravity of the entire machine, thus including the bed is arranged in top view within the base surface of the bed.

Thus the cutter motor for driving the cutter advantageously protrudes from the X-slide at a back side in the Z direction and extends past the portal slide that carries the X-slide. This yields a particularly space saving arrangement.

For the same reason also the X motor that moves the X-slide relative to the Z portal is also arranged in front of the cutter axis and advantageously above the cutter axis.

Transmitting the drive force from the milling motor to the internal milling cutter is performed by a milling transmission which is arranged in a transmission protrusion which protrudes from a remainder of the X-slide in the transversal plane and which advantageously has no larger width in the Z-direction than the remainder of the X slide.

Typically the internal milling cutter is not directly supported in the X slide but attached in a rotation unit that co rotates with the internal milling cutter wherein the rotation unit is configured as an annular so called spoke plate which extends primarily in the transversal plane and which includes a pass through opening for receiving the internal milling cutter torque proof therein.

This spoke plate includes spoke shaped spacers that are distributed over the circumference in the Z-direction and which protrude backward in a direction towards the X-slide wherein the spacer are also attached torque proof with their free ends at a rotation ring that is continuous in the circumferential direction. The rotation ring is rotate ably supported in the X-slide by a milling cutter bearing.

The milling cutter bearing is advantageously configured as a so called Y R T bearing that is otherwise used for supporting horizontally arranged turn tables of machine tools and which includes barrel shaped or cylindrical bearing rollers.

The advantage of the spoke plate and in particular of the spacers arranged distributed and offset in the circumferential direction is that the chips that fall down on both sides of the transversal plane of the internal milling cutter can fall down between the spacers onto the mounting surface of the bed during falling down in a direction of the X slide and which are thrown down very quickly by the spacers of the spoke plate that co-rotate with the internal milling cutter. Thus heating the spoke plate and thus the bearing in the X slide is substantially avoided which improves machining precision of the entire machine.

Furthermore the machine advantageously includes an additional clamping device so that the crank shaft can be supported between the clamping chucks as close as possible to the machining location or in the portion between the two clamping chucks. In this case the additional clamping device includes advantageously two clamping elements that are move able relative to each other, advantageously clamping plates that are radially pressable on both sides against a respective journal of the crank shaft and which therefore respectively have an advantageously prison shaped receiver on a side that is oriented towards the work piece wherein contact surfaces of the receiver oriented towards the work piece are provided with a sliding coating, advantageously with poly crystalline diamond plates PKD pads.

For this purpose a clamping X-slide is move ably supported in a controlled manner in the X' direction or in the X direction on a clamping Z-slide that is supported along Z-supports in the Z-direction on the mounting surface.

The clamping plates extend in the transversal plane and protrude from the clamping X-slide in a direction towards the cutter axis and beyond the cutter axis.

The two clamping plates are move able relative to the clamping X-slide in a transversal direction, advantageously in the X' direction or in the X direction in a controlled manner in order to perform the clamping movement.

The clamping Z-slide runs on Z-supports which are arranged in the transversal direction, advantageously in the X-direction offset between the Z-supports for the one or the two Z-slides of the tool supports.

Typically a machine of this type as stated supra includes an opposite spindle stock which then also has to be move able in the Z-direction in order to be capable to clamp crank shafts with different lengths.

The opposite spindle stock which then advantageously also runs along the same longitudinal guides on which the clamping Z slide runs, move on longitudinal supports that are arranged between the longitudinal supports for the one or the two cutter supports.

The machine also includes a housing that defines the operating cavity secures it and seals it against unauthorized manual interference.

Thus the two sides of the housing are made from segments that closely adjoin one another in closed condition viewed in the Z direction and that are strip shaped in a front view, wherein the segments are move able individually and are move able also into each other viewed in the Z direction, thus into the same Z portion advantageously the Z portion of one of the tool spindles due to different dimensions fitting into each other, so that the entire operating portion between the clamping chucks including the clamping chucks is open and accessible.

Additionally an insertion opening can be provided in a top side of the housing and close able by an insertion flap or the insertion door so that an insertion opening for replacing the work piece can be opened in a top side of the housing without moving the segments of the housing in the Z-direction.

c) Embodiments

Embodiments of the invention are subsequently described in more detail with reference to drawing figures, wherein:

FIG. 1b illustrates the machine of FIG. 1a in the same view without work space cover in a partial configuration;

Figure 2:
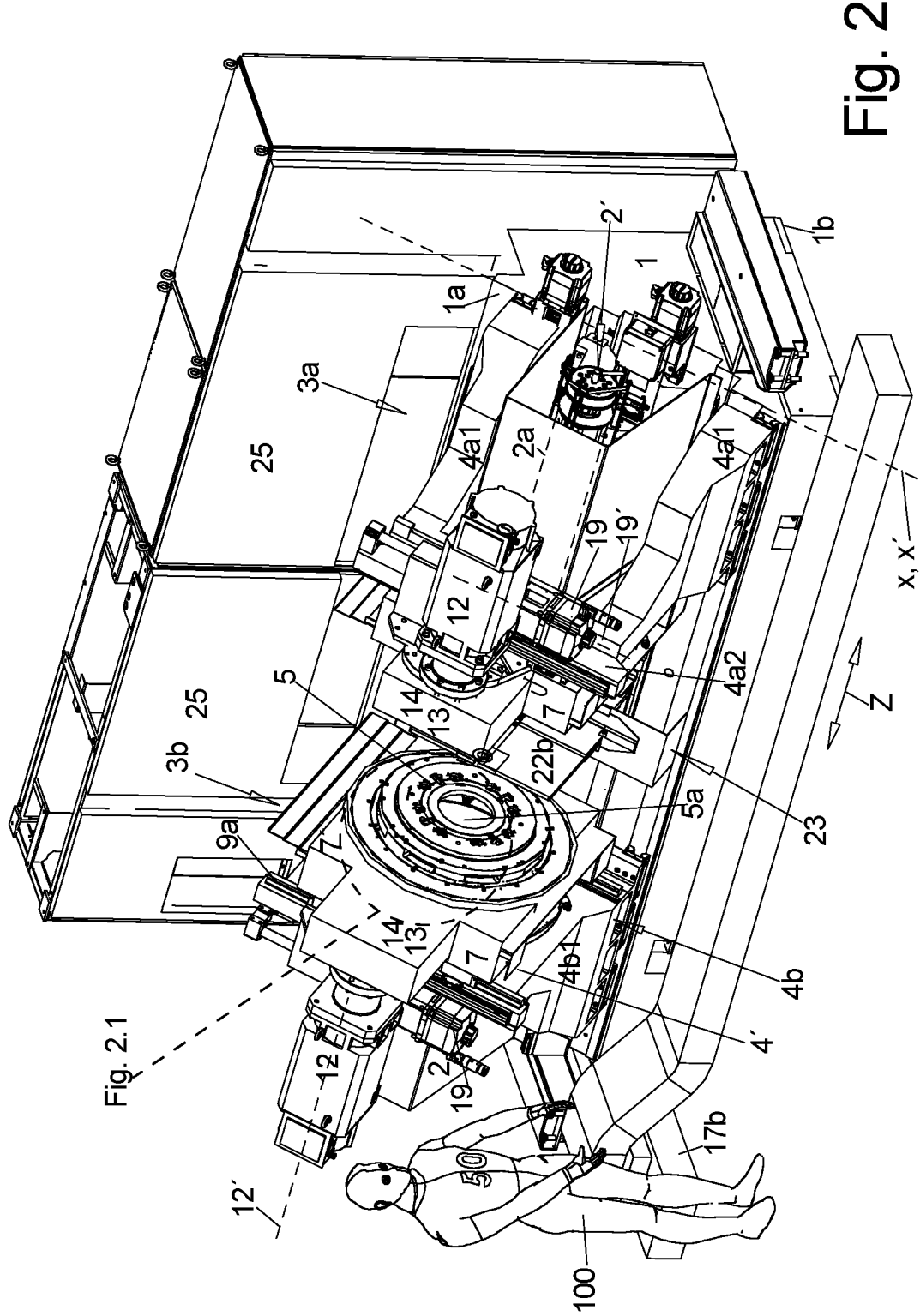
Figure 3A:
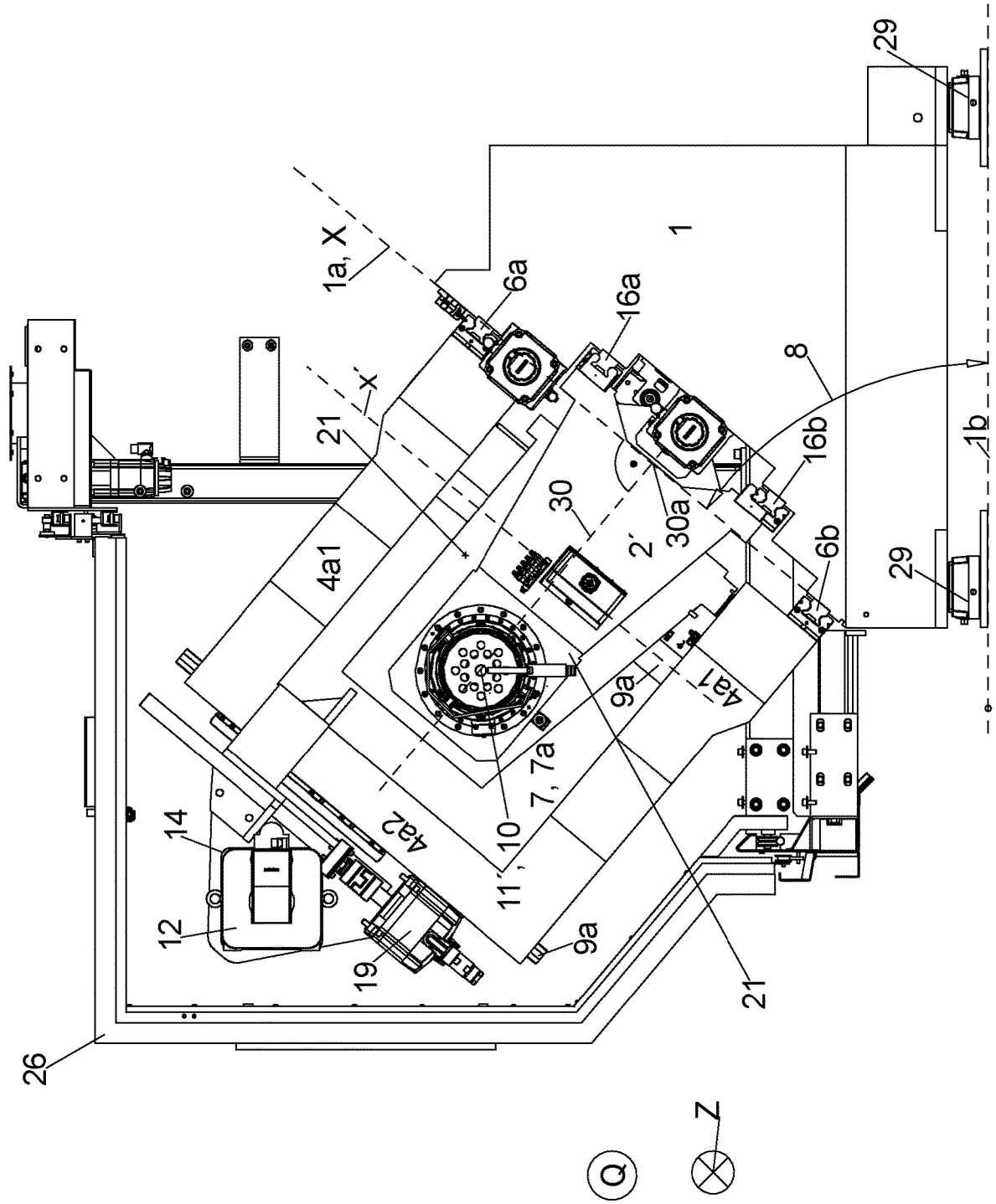
Figure 3B:
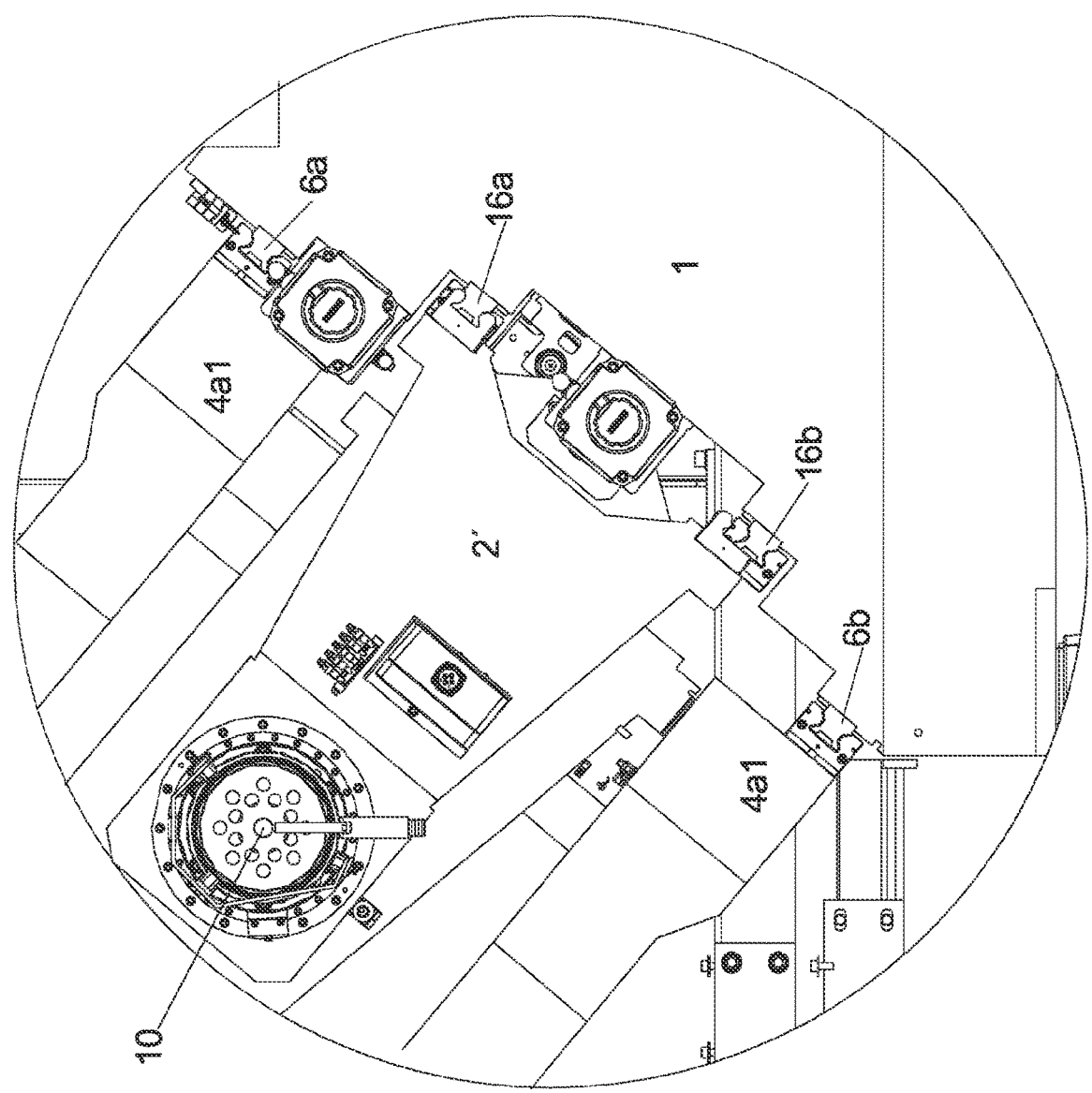
Figure 3C:
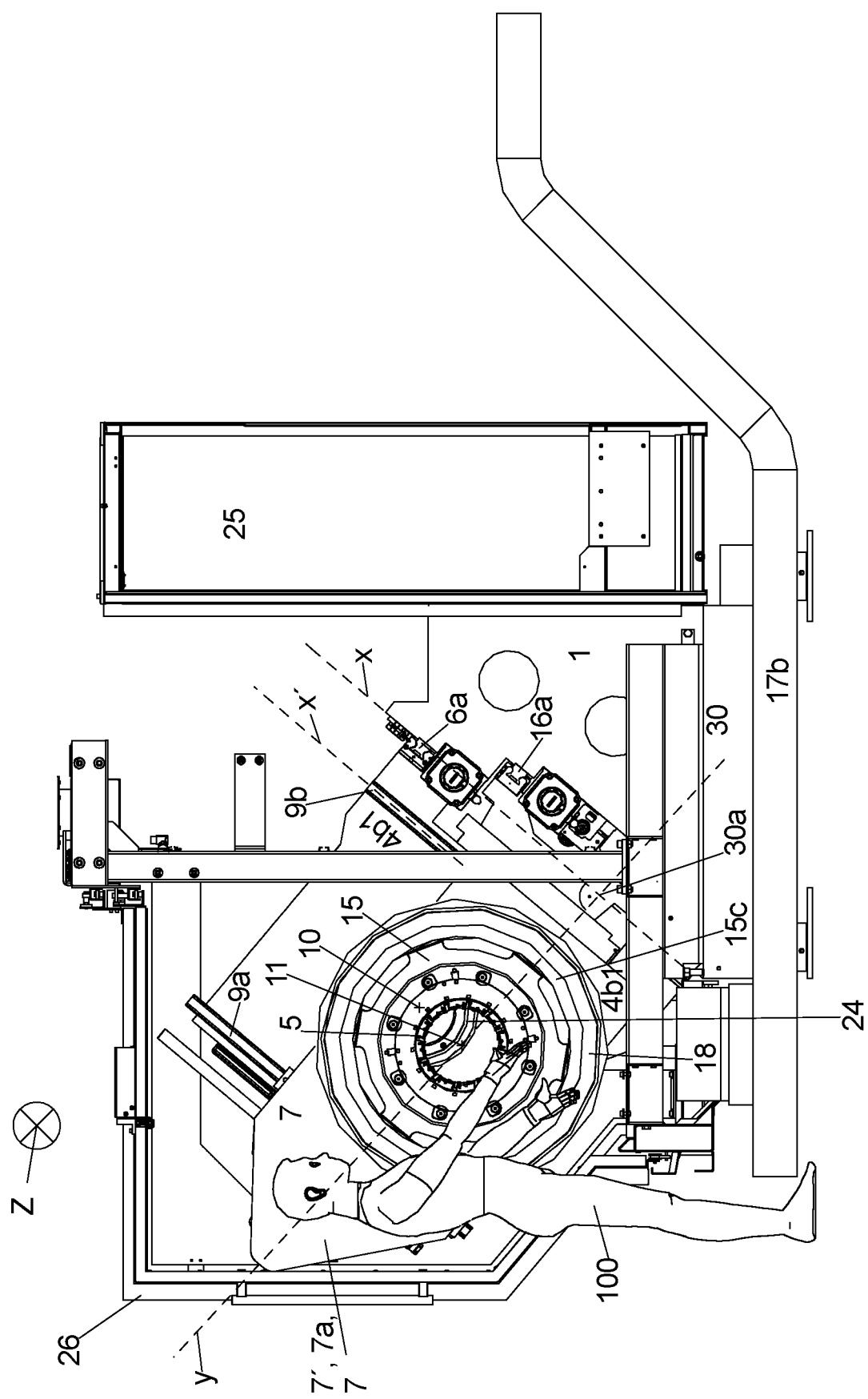
Figure 4A:
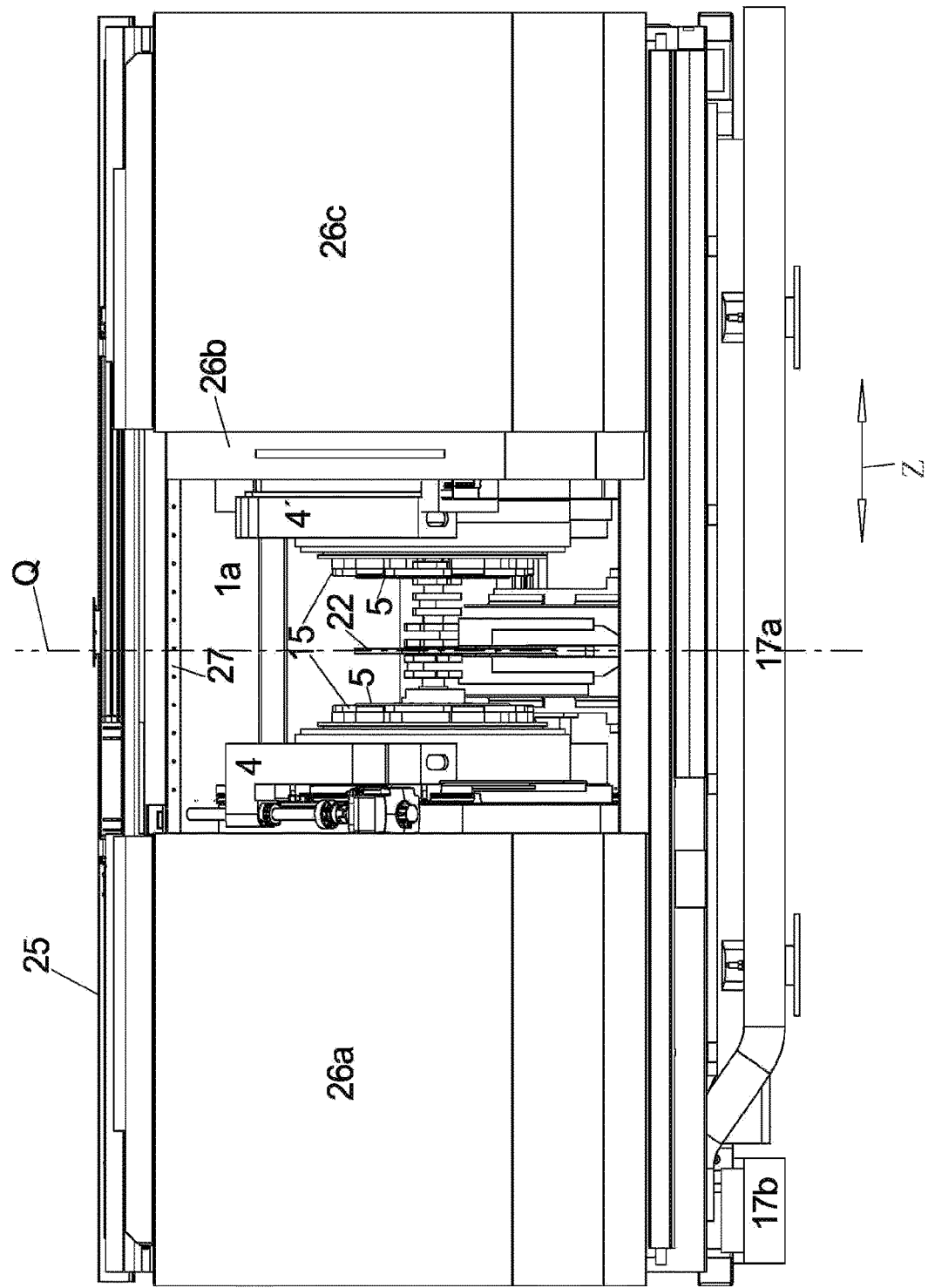
Figure 4B:
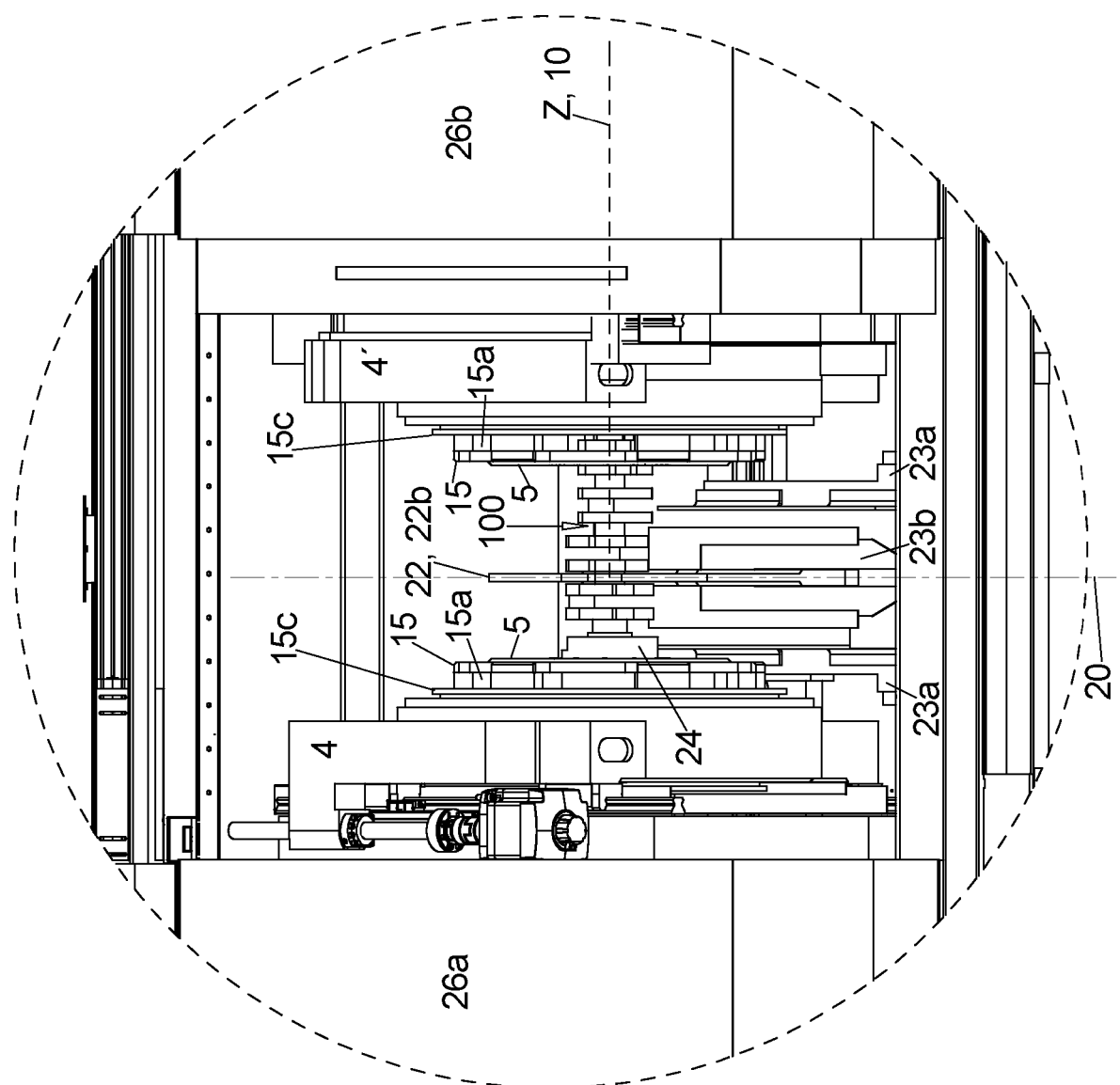

FIG. 1b1 illustrates an enlarged detail view of a portion of the machine of FIG. 1b;

FIG. 1c illustrates an additional clamping device in an individual view;

FIG. 2 illustrates a perspective view of a second embodiment of the machine without work space cover;

FIG. 2.1 illustrates an enlarged detail view of a portion of the machine of FIG. 2;

FIG. 3a illustrates a view of a machine that essentially corresponds to the same embodiment viewed in the Z direction from the right side according to FIG. 2;

FIG. 3b illustrates an enlarged view of FIG. 3a;

FIG. 3c illustrates the left tool support of FIG. 2 viewed in the Z-direction in a maintenance position;

FIG. 4a illustrates a front view of the machine thus orthogonal to the Z direction precisely from a front;

FIG. 4b illustrates a detail enlargement of FIG. 4a.

The illustrated machine includes a slanted bed, thus a machine bed 1 that includes a mounting surface 1a that slopes downward at a slant angle forward thus towards the operator side and on which the additional components of the machine are attached, partially move able in the Z direction, the main extension of the bed 1 on Z supports 6a, b, 16a, b as evident best in FIG. 1b.

The mounting surface 1a of the bed 1 has many steps viewed in the Z direction 10 that form individual attachment surfaces however the attachment surfaces that carry the 2 respectively corresponding Z supports 6a and 6b are 16a, 16b respectively include a plane with the same inclination, the bed angle 8 relative to the lower support surface 1b of the bed 1 by which the bed is supported on the ground and which is evident best in FIG. 2 or FIG. 3a.

When set up completely the machine as evident best from FIG. 2 and FIG. 4a, b initially has a spindle stock 2 like a turning machine wherein a first end of the work piece configured as a shaft, advantageously a crank shaft 100 is clamped in the spindle stock in a controlled manner about the rotation axis 10 which defined the Z-direction in which the work piece spindle of the spindle stock 2 is received.

As evident from FIG. 2, an opposite spindle stock 2' is often provided that is also mounted on the bed 1 so that the clamping chucks 24 mounted on the work piece spindles on both sides are sealed relative to each other and can respectively clamp one of the ends of the work piece and can rotate it synchronously. Whereas the spindle stock 2 that is not illustrated in FIG. 1b for reasons of clarity is typically mounted fixed in place on the mounting surface 1a of the bed 1. The opposite spindle stock 2' of which only the clamping chuck 24 is shown in FIG. 1b is move able in the Z direction, thus the direction of the rotation axis 10 on the two Z-supports 16a, b that extend in the Z-direction in order to be able to clamp work pieces with different lengths in the machine and in order to be able to rotate them in a controlled manner and thus machine them in the machine.

A pair of support bases 29 is typically arranged at a bottom side of the bed 1, wherein the support bases are illustrated in FIG. 3a wherein the lower contact surfaces of the support bases 29 that are typically elevation adjustable define the lower support surface 1b of the bed 1 and only when such support bases 29 are not provided as illustrated e.g. in FIG. 2 the bottom side of the bed 1 defines the lower support surface 1b of the bed 1.

In the embodiment according to FIG. 2 the machine has 2 tool supports 3a, b that are offset in the Z direction wherein the tool support respectively carry an internal milling cutter at a respective opposing front side, wherein the work piece extends through a free inner pass through opening 5a during processing, thus typically the crank shaft 100 whose diameter is machined by the internal milling cutter 5 as evident from FIGS. 4a, b.

In the illustration of FIG. 1b only one tool support 3a is shown which is also possible.

FIG. 1b shows the two Z-supports 6a, b that are arranged outside, thus above and below the Z-supports 16a, b on the mounting surface 1a of the bed 1 on which the one or also the 2 tool supports 3a, b are move able in the Z-direction in a controlled manner as illustrated in FIG. 3a.

Figure 1A:
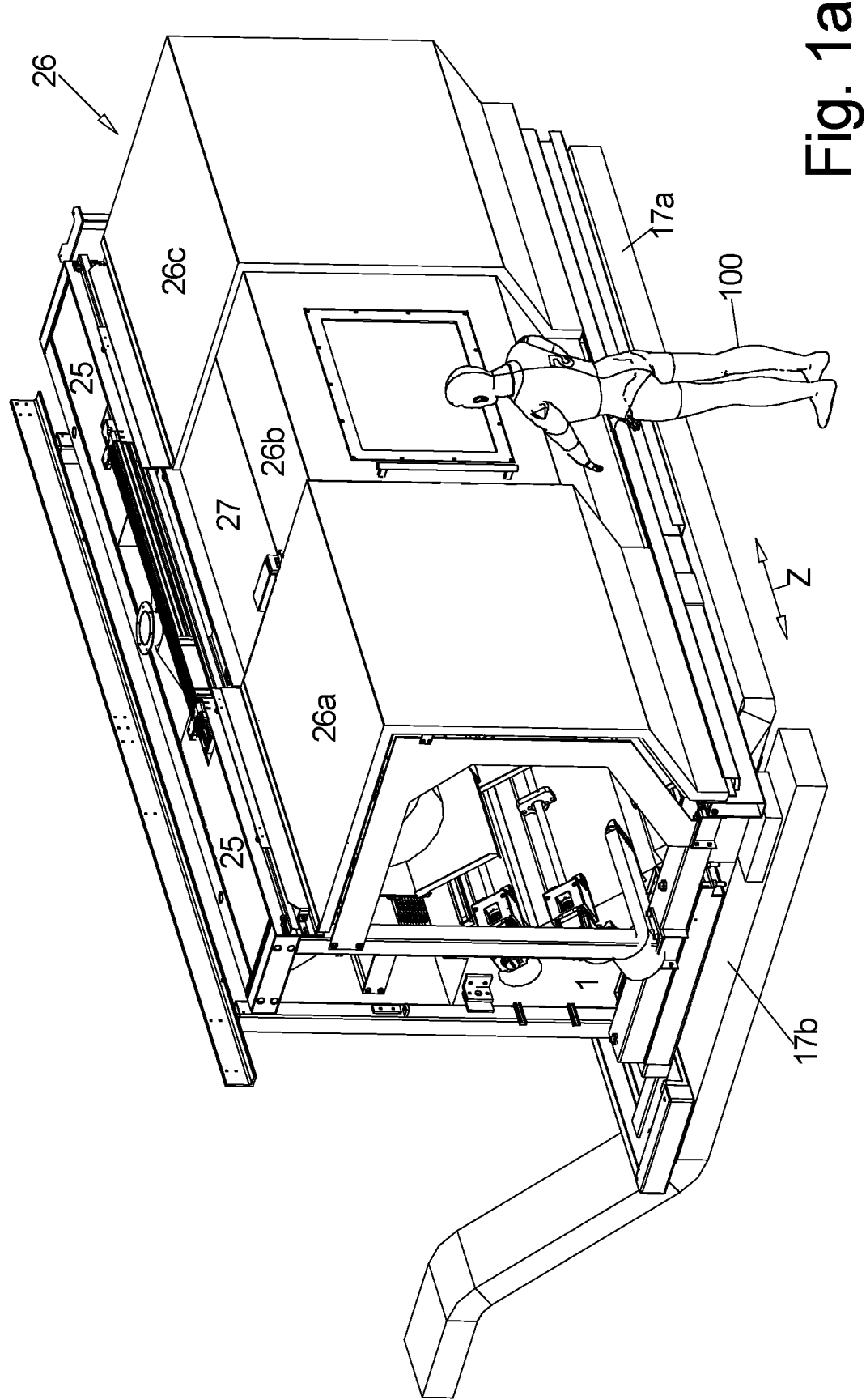
FIG. 1a illustrates a perspective view of a first embodiment of the machine in a substantially closed condition.

FIG. 1a illustrates the machine according to FIG. 1b with the work move able work space cover 26 that is provided in practical application which closes at least the top side and the front side of the machine in a closed condition, and thus the operating space in which the bed 1, the spindle stock 2 and opposite spindle stock 2', the tool supports 3a, b and during processing also the work piece 100 that is only illustrated in FIGS. 4a, b.

The work space cover 26 is made from strips 26a, b, c that are adjacent to each other and adjoin each other in the front view or in the top view in the Z direction and which are move able in the Z direction along corresponding guides that are attached at a machine frame that is supported by the machine bed so that at least 2 respective strips, better all provided strips are arranged in the same length portion of the Z-direction wherein they are pushed into each other or below each other, so that at least the center operating portion of the machine as illustrated in FIG. 4a, b, advantageously the entire remaining length portion in Z-direction of the machine is open and accessible for maintenance and repair.

In the instant case a viewing window is fabricated in one of the strips 26b advantageously in the center strip in closing position on the front side wherein an operator can see the processes in the operating cavity also during processing.

Furthermore a flap 27 is provided above the rotation axis 10 in a top side of at least one strip that has a right angle shoulder in the Z-direction wherein the flap is large enough in the Z direction so that a work piece can be lowered from above into the operating work space of the machine and clamped in the machine when the one flap or the plural adjoining flaps 27 are opened without having to move the strips 26a, b, c of the work space cover 26 in the Z direction from the closed position.

FIGS. 1a and b also show the chip conveyor 17.

Not only the recesses with shoulders in the mounting surface 1a of the bed 1 that visible in FIG. 1b but also the Z-supports 6a, b, 16a, b are covered with non-illustrated covers during operations of the machine wherein the covers are partially moved together with the components that are move able in the Z direction, like tool supports 3a, b and opposite spindle stock 2' and which have a substantially flat top side that slopes forward downward onto which the very hot chips that are generated during processing drop and slide downward in a direction towards a bottom side of the surface.

The longitudinal chip conveyor 17a extends in the Z-direction below this front edge so that the chips falling off from the front edge fall into the longitudinal chip conveyor 17a that is open on top are transported by the longitudinal chip conveyor to one of its ends and transferred to a transversal chip conveyor 17b at this location which transports the chips backward along one of the faces of the machine and into a chip collection container that is not illustrated.

As evident in particular from FIG. 1a in top view at least the longitudinal chip conveyor 17a is completely arranged within the overall dimensions of the machine in top view and the transversal chip conveyor 17b is at least partially arranged therein, so that the space requirement for the machine is not increased by the chip conveyor besides the ejection end of the transversal chip conveyor 17b which may protrude backward beyond a base surface of the machine, wherein a configuration and protrusion of the transversal chip conveyor however is a function of local conditions at the set up location.

As evident from FIGS. 2 and 3a, c each tool support 3a, b is made from a Z-slide 4a or 4b which has two side elements 4a1, 4b1 in top view of the mounting surface 1a which extend from the front surface 4' of the Z-slide 4a or 4b in the Z-direction away from the back side of the respective Z-slide 4a or 4b and which run with their bottom sides on one of the respective Z-supports 6a, b as evident in FIG. 3a and the enlarged view 3b.

The two side elements 4a1, 4b1 are triangular or L shaped in side view and protrude upward at or proximal to the front surface 4' from the supports 6a, b and are connected with each other at an upper end by a yoke for 4a2, 4b2 to form a portal, wherein a front surface 4' of each Z-slide 4a or 4b oriented in the direction the respective other tool support 3*a*, *b* is formed by the front surfaces of the yoke 4*a*2, 4*b*2 and the side elements 4*a*1, 4*b*1 that are aligned with each other.

A cross section 7 is supported along transversal supports 9*a, b* perpendicular to the rotation axis 17 at the front surface 4' of each slide 4*a* or 4*b*, along transversal supports 9*a, b* wherein an upper transversal support 9*a* is typically attached at the front surface 4' in the portion of the yoke 4*a*2, 4*b*2 and the lower transversal guide which is opposite with respect to the rotation axis 10 extends from along the front surface 4' from one side element 4*a*1 to another side element 4*a*2, thus crosses the free space of the portal shaped Z-slide 4*a* or 4*b*.

The pass through opening that remains between the upper yoke e.g. 4*a*2 and the lower transversal support 9*b* in order to let at least the clamping chuck 24 pass through in the Z-direction better also the adjoining work piece spindle and/or the opposite spindle 2' and/or the crank shaft 100. Thus the 2 Z-slides 4*a* or 4*b* can be moved far enough in the Z-direction to the adjacent spindle stock 2 or the opposite spindle stock 2' so that the portion between the clamping chucks 24 that are oriented towards each other and including at least the Z portion of the clamping vices of the clamping chucks 24 is free to facilitate insertion of a work piece like e.g. a crank shaft 100 from above or from a front side between two clamping chucks 24.

The annular internal milling cutter 5 is rotate ably supported in this transversal slide 7 and the internal milling cutter 5 is brought in contact with the outer circumference of the diameter of the work piece that is to be processed by moving the transversal slide 7 in the movement direction X', and when the diameter is arranged eccentrical to the rotation axis 10, like e.g. the main bearing of a crank shaft that is clamped on the main bearing access in the machine the transversal movement of the transversal slide 7 has to be controlled in the movement direction X' together as a function of the rotation of the work piece.

Certainly also the free inner pass through of the internal milling cutter 5 has to be large enough in order to let at least the clamping chuck 24 pass through in the Z-direction, better also the adjoining work piece spindle 2, and/or the opposite spindle 2' and/or the crank shaft 100 as illustrated in FIG. 1*b*1.

As illustrated by FIGS. 3*a* and 3*c* the movement direction X' runs in this case parallel to the extension X of the mounting surface 1*a* viewed in the direction of the rotation axis 10 however theoretically the movement direction X' can also extend at an acute angle to the extension direction X.

As evident from FIGS. 1*b*1 and 2 and from the front view of FIG. 4*a, b* and from FIG. 2.1 the internal milling cutter 5 is received torque proof with its free pass through opening 5*a* at an outer circumference in an annular spoke plate 15 torque proof wherein the annular spoke plate is positioned in the Z-direction in front of the front surface 7' of the transversal side 7 and form which spoke shaped spacers 15*b* protrude in backward direction distributed over the circumference that are fixed at a rotation ring 15*c* that is offset in the Z-direction relative to the spoke plate 15.

Only this rotation ring 15*c* is rotate ably supported at its outer circumference by a milling cutter bearing 18 in the transversal side 7.

The pass through openings 15*a* that are provide in the circumferential direction and that are clear in the radial direction and provided between the spacers 15*b* are used to let the milling chips that move into the portion radially within the ring of spacers downward and out of the ring which occurs very quickly and with a small dwelling time of the milling chips on the spacers 15*b* since the spacers 15*b* orbit.

Since the milling cutter 5 respectively requires a high level of drive power and thus a rather large cutter motor 12 and the transversal side 7 requires a cable X-motor 19 for movement in the travel direction X' also the arrangement of the electric motors and of the additionally required transmissions has to be selected so that it requires easy access for maintenance and repair and does not interfere with machining and the large and heavy milling cutter motor 12 does not negatively influence the position of the center of gravity 21 of the machine and in particular of the tool support as drawn in an exemplary manner in FIG. 3*a* since the center of gravity is arranged in top view within the base surface of the machine bed 1.

In this respect the embodiment of FIG. 1*b* differs from the embodiment of FIGS. 2 and 3*a-c:*

The milling cutter motor 12 is arranged in the embodiment according to FIG. 1*b* with its drive axis 12' parallel to the Z-direction. The cutter transmission 13 sits in a transmission protrusion 14 of the transversal slide 7 that protrudes in the travel direction from a lower portion of the rear edge of the transversal slide 7 in the travel direction X' from the cutter axis 5' backward in a direction of the electrical cabinets 25, wherein the transmission protrusion 14 protrudes upward beyond the upper edge of the Z-slide 4*a, b* to that the milling cutter motor 12 extends beyond the upper end of the adjacent Z-slide 4*a* or 4*b*, in particular its portal 4*a*1+4*a*1+4*a*2.

The milling cutter motor 12 is attached so that it protrudes from the transmission protrusion 14 backward thus to the adjacent spindle stock or the opposite spindle stock 2' and extends behind the Z-slide 4*a* at a distance in the movement direction X' so that the transversal slide 7 can assume any required transversal position relative to the Z-slide 4*a*.

The X-motor 19 is advantageously arranged at a back side of the Z-slide 4*a* that is oriented away from the transversal slide 7, wherein a drive axis 19' of the X motor 19 advantageously extends parallel to the rotation axis 10.

In order to approve accessibility the transmission protrusion 14 in the embodiment of FIG. 2 and FIG. 3*a, c* wherein the transmission protrusion includes the milling cutter transmission 13 is arranged upward forward protruding at a slant angle at the top side of the transversal slide 7. The cutter motor 12 is arranged in this embodiment with the same orientation of its drive access at the back side of the cutter protrusion 14 so that the cutter motor 12 is positioned in this manner further forward in a direction towards the operator side and also slightly lower.

The X-motor 19 is also attached in this embodiment at the back side of the Z-slide 4*a*, thus at the back side of its yoke 4*a*2 however extending with its drive axis 19' in the movement direction X'.

Whereas the transmission protrusion 14 in FIG. 2 has a rectangular contour viewed in the Z-direction the transmission protrusion 14 is illustrated in FIGS. 3*a, c* viewed in Z direction with an approximately triangular contour with a base of the triangle extending in the movement direction X'. Thus the shape and size of the transmission protrusion 14 is determined by the dimensions of the cutter transmission 13 to be arranged therein which is required in order to drive the internal milling cutter 5 with the right speed and with the right torque from the cutter motor 12.

Independently from the embodiment it shall hold however like in FIG. 3*a* viewed in the Z direction of the rotation axis 10 that a line 30 that is drawn from the cutter center 11' onto an extension of surface 1a in the X direction yields a base 30a of the line which is still in the intermediary space between the two Z supports 6a, b for the tool supports in all operating conditions of the machine in top view.

In order to achieve a high level of machining precision typically the work piece is supported during machining additionally in the Z direction as close as possible adjacent to the machining location by an additional clamping device 22 as illustrated in FIG. 2 as well as in FIG. 1b in the machine and in FIG. 1c as individual component in a specific embodiment.

The work piece, typically a crank shaft 100 is thus clamped between 2 clamping elements wherein 2 clamping plates 22a, b are used as clamping elements which are offset from one another perpendicular to the rotation axis 10 and in the movement direction X' so that the work piece can be clamped there between my running their narrow sides towards each other. Thus a prism shaped receiver 22a1 22b1 is provided according to FIG. 1c in each of the clamping plates 22a, b which contacts a respective side of the contour of the work piece diameter to be clamped, wherein contact surfaces of the receiver are provided with a sliding coating since the crank shaft 100 rotates during machining and has to be able to slide on the contact surfaces of the receivers that are pressed against each other.

The two clamping plates 22a, b are configured on an auxiliary slide 23 which includes a clamping Z-slide 23a that is moved in a controlled manner in the Z direction along the second supports 16a, b and on which a clamping slide X slide 23b is moved in a controlled manner in the X direction or in the movement direction X' wherein the clamping slide carries the two clamping plates 22a, b.

The two clamping plates 22a, b are move able in the X direction or the movement direction X' on the clamping—X-slide 23.

REFERENCES AND NUMERALS AND DESIGNATIONS 1 bed
1a mounting surface
1b support surface
2 spindle stock
2' opposite spindle stock
3a, b tool support
4a, b portal slide, Z slide
4a1, 4b1 side element
4a2, 4b2 yoke
4' frontal surface
5 internal milling cutter
5' cutter axis
5a clear pass through
6a, b first Z-support
7 transversal side
7' front surface
8 bed angle
9a, b transversal support
10 rotation axis, Z-direction
11 cutter axis
11' cutter center
12 cutter motor
12' drive axis
13 cutter transmission
14 transmission protrusion
15 spoke plate
15a free pass through
15b spacer
15c rotation ring
16a, b second Z support
17a longitudinal chip conveyor
17b transversal chip conveyor
18 cutter bearing
19 X-motor
19' drive axis
20 transversal plane
21 center of gravity
22 additional clamping device
22a, b clamping element, clamping plate
22a1/b1 receiver
23a clamping Z-slide
23b clamping X-slide
24 clamping chuck
25 electrical cabinet
26 work space cover
26a, b strip
27 flap
29 support base
30 vertical
30a base point
X extension direction of the mounting surface
X' movement direction
Y second transversal direction perpendicular to movement direction X'

The invention claimed is:

1. An internal milling machine for machining rotating work pieces with an internal milling cutter, the internal milling machine comprising:
  (a) a first spindle stock (2) rotatably supporting a work piece spindle that is rotatable in a controlled manner about a rotation axis (10) that extends in a Z-direction,
  (b) a bed (1) comprising:
    (i) a mounting surface (1a) for the first spindle stock (2), which mounting surface (1a) extends in the Z-direction and in an X-direction that is perpendicular to the Z-direction, and
    (ii) a lower support surface (1b),
    wherein the mounting surface (1a) is sloped downward relative to the support surface (1b) by a bed angle (8) from a backside of the bed towards a front side of the bed,
  (c) a tool support (3a), including:
    (i) a Z-slide (4a) in the form of a portal slide that is movable in the Z-direction along the bed (1) on first Z-supports (6a, b), the portal slide including two arms interconnected by a yoke, wherein each of the arms is movable in the Z-direction along a respective one of the first Z-supports,
    (ii) a transversal slide (7) that is movable along the Z-slide (4a) in a movement direction X' along transversal supports (9a, b), wherein the X' movement direction extends transversal to the Z-direction,
    (iii) an annular internal milling cutter (5) that is rotatably supported for rotation about a cutter axis (11) that extends in the Z direction, which milling cutter and that is drivable by a cutter drive,
  wherein:
    a Z pass-through that is open in the Z direction is configured through the Z-slide (4a) between the arms,
    the movement direction X' of the transversal slide (7) is inclined along the portal slide (4a) relative to the X-direction by an angle that is from 0° to 45°, and
    wherein the first spindle stock is receivable within the Z pass-through.

2. The machine according to claim 1, wherein the angle of the movement direction X' relative to the X direction is 30° at the most.

3. The machine, according to claim 1, further comprising a second spindle stock (2') rotatably supporting a further work piece spindle, the second spindle stock (2') being provided as to be movable in the Z-direction along the bed (1) along second Z-supports (16a, b), and the second Z supports (16a, b) are arranged within the first Z supports (6a, b).

4. The machine according to claim 1, characterized in that
the transversal supports (9a, b) are arranged opposite to each other with respect to the rotation axis (10) of the work piece spindle, and/or
wherein a base point (30a) of a line (30), which line extends from a center (11') of the cutter to the base point (30a) at an extension, extending in the X-direction, of the mounting surface (1a), when the line is viewed along the Z-direction, is inside of an intermediary space between the first Z-supports (6a, b) for the tool support at least during machining.

5. The machine according to claim 1,
wherein the two arms of the portal slide (4a) are supported such that a respective lower end of each of the two arms is supported at a respective one of the first Z-supports (6a, b).

6. The machine according to claim 1,
further comprising a second tool support (3b) movable in the Z-direction along the same first Z-supports (6a, b) along the bed (1), the second tool (3b) support including:
(i) a second Z-slide (4b) in the form of a second portal slide that is movable in the Z-direction along the bed (1) on the first Z-supports (6a, b), the second portal slide including two second arms interconnected by a second yoke, wherein each of the second arms is movable in the Z-direction along a respective one of the first Z-supports,
(ii) a second transversal slide (7) that is movable along the second Z-slide (4b) in the movement direction X' along second transversal supports (9a, b), and
(iii) a second annular internal milling cutter (5) that is rotatably supported for rotation about a second cutter axis (11) that extends in the Z direction, which second milling cutter is drivable by a second cutter drive,
and
wherein each of the two transversal slides (7) is arranged beside a respective side surface (4') of the corresponding portal slide carrying the respective milling cutter, wherein each of the side surfaces is located on a side of the corresponding tool support that is closest to the respective other tool support (3a, b).

7. The machine according to claim 1, characterized in that the bed angle (8) is from 40° to 60°.

8. The machine according to claim 1, characterized in that the cutter drive includes a cutter motor (12) and a cutter transmission (13), wherein the cutter motor (12) is arranged above the rotation axis of the cutter, or is arranged, when viewed in a top view, in front of the rotation axis of the cutter and wherein:
(i) the cutter transmission (13) is arranged in a transmission protrusion (14) which protrudes from a remainder of the transversal slide (7) in a transversal direction Y, which transversal direction Y is transverse to the Z-direction and is orthogonal to the movement direction X', and/or
(ii) the cutter transmission (13) is arranged in a transmission protrusion (14) that protrudes from a remainder of the transversal slide, wherein the transmission protrusion (14) is not wider in the Z-direction than a remainder of the transversal slide (7).

9. The machine according to claim 1, characterized in that the transversal supports (9a, b) are positioned at the Z-slide (4a, b) and configured long enough so that the transversal (7) is moveable forward and downward so that the rotation axis (10) of the work piece is arranged outside of a free inner diameter of the internal milling cutter (5).

10. The machine according to claim 1, wherein
the internal milling cutter (5) is arranged in a pass through opening (15a) configured in a spoke plate (15) that extends in a transversal plane that is transverse relative to the Z-direction and wherein the spoke plate (15) includes plural spacers (15b) that extend in the Z-direction, and that are distributed over a circumference of the spoke plate wherein the spacers are attached with free ends thereof at a rotation ring (15c) which is supported in the transversal slide (7) by a cutter bearing (18) for rotation about the cutter axis (11).

11. The machine according to claim 10,
an inner diameter of a free inner pass through (5a) of the internal milling cutter (5) or of the free inner pass through (15) of the spoke plate (15) is greater than an outer diameter of a clamping chuck (24) of the work piece spindle.

12. The machine according to claim 1, wherein
a longitudinal chip conveyor (17a) is arranged in top view in front of a front edge of the bed (1).

13. The machine according to claim 12, further comprising a transversal chip conveyor (17b) having a longitudinal axis that is transverse relative to a longitudinal direction of the longitudinal chip conveyor (17a).

14. The machine according to claim 1, wherein the machine is configured and sized so that the center of gravity (21) of the entire machine including the bed (1) is arranged within a periphery of the lower support surface of the bed (1) when the machine is viewed along a vertical axis.

15. The machine according to claim 1,
wherein a clamping device (22) is provided that is moveable on an auxiliary Z-slide (23a) in the Z-direction along the mounting surface (1a) of the bed (1) on second Z-supports (16a, b).

16. The machine according to claim 1,
wherein an X-motor (19) driving the transversal slide (7) is arranged, when viewed in top view, in front of the cutter axis (11) and above the cutter axis (11).

17. The machine according to claim 1,
wherein an auxiliary clamping device (22) is provided, wherein the auxiliary clamping device (22) includes two clamping plates (22a, b) that are moveable relative to each other in a transverse plane transverse to the Z-direction, wherein the clamping plates (22a, b) protrude from an auxiliary X slide (23b) in a direction toward the rotation axis (10) of the work piece.

* * * * *